Patented Aug. 31, 1943

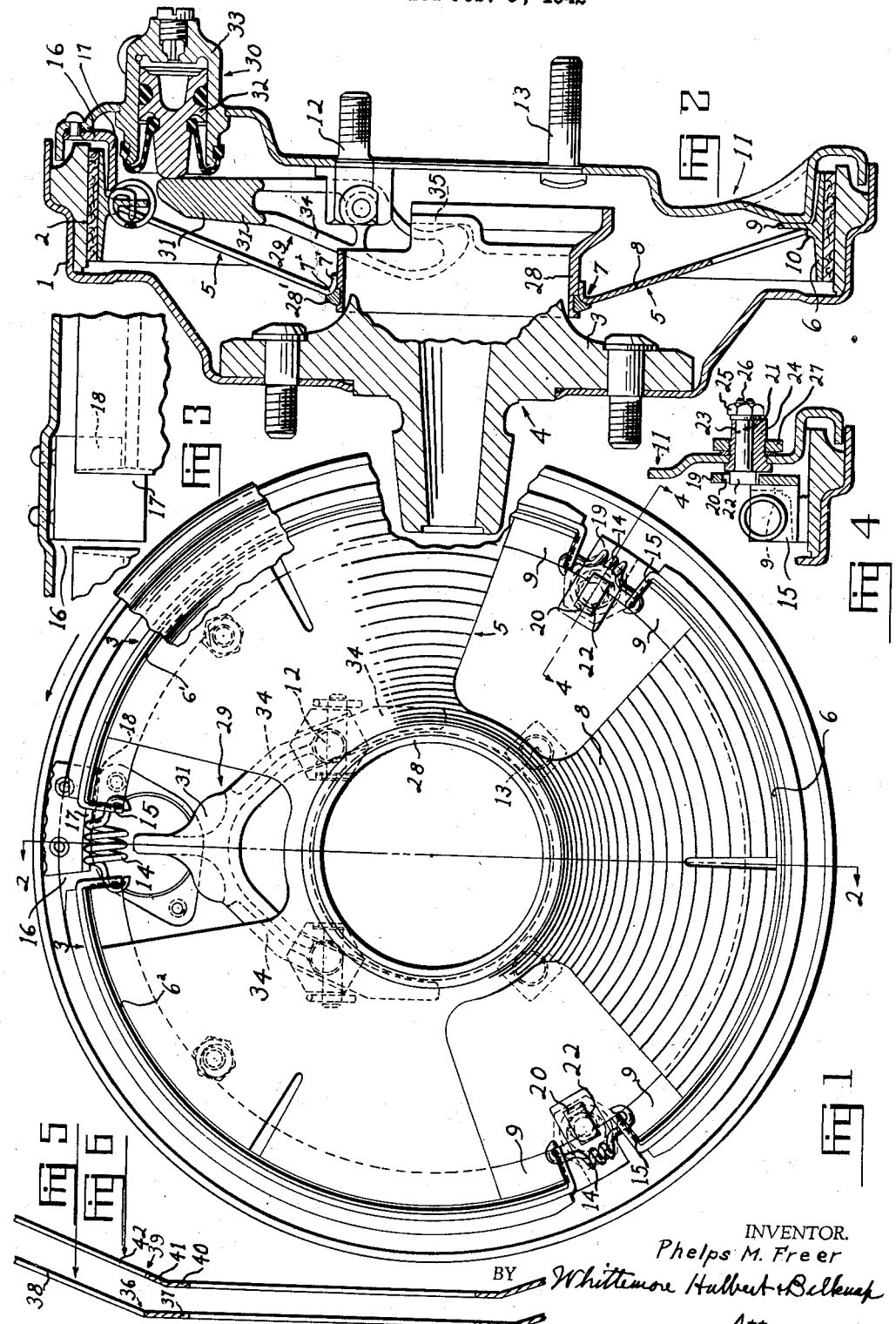

2,328,334

UNITED STATES PATENT OFFICE 2,328,334

BRAKE

Phelps M. Freer, Detroit, Mich.

Application February 9, 1942, Serial No. 430,145

8 Claims. (Cl. 188—78)

The invention relates to brakes and more particularly to brakes for motor vehicles, airplanes, and the like, of that type in which one of the relatively rotatable friction elements comprises a plurality of friction members movable into engagement with the other of the friction elements.

The invention has for one of its objects to provide a brake so constructed that the friction elements effectively frictionally engage each other in operative position and are completely disengaged from each other in inoperative position.

The invention has for another object to provide an anchoring means for the friction members comprising individual adjustable anchors for certain of the friction members serving to center the elements relative to each other.

The invention has for a further object to so construct the element comprising a plurality of friction members that it provides sufficient clearance to enable the use of an actuating member sufficiently strong and rigid to withstand the stresses to which it is subjected.

With these as well as other objects in view, the invention resides in the novel features of construction and combinations and arrangements of parts as more fully hereinafter set forth.

In the drawing—

Figure 1 is an elevation, with parts broken away, of a friction coupling embodying the invention;

Figures 2, 3 and 4 are cross sections on the lines 2—2, 3—3 and 4—4, respectively, of Figure 1;

Figures 5 and 6 are sections of portions of modified discs.

The rotatable friction element of the brake comprises the brake drum 1 having the internal annular friction face 2. The brake drum, as shown, is mounted upon the fixed flange 3 of the hub 4, the fixed flange being provided with suitable means for securing a vehicle wheel thereto.

The non-rotatable friction element of the brake comprises the disc 5 and the lower, upper right and upper left friction members 6, 6' and 6², respectively, mounted on the periphery of the disc. The disc has the central or inner portion or hub 7 and the spokes 8 radiating from the central or inner portion or hub and equally spaced from each other, there being one spoke for each friction member. The central or inner portion or hub 7 has the cylindrical portion 7' and the annular flange portion 7² at the outboard end from which the spokes 8 extend. The friction members are preferably T-section shoes having their webs 9 formed at their outboard sides with the arcuate shoulders 10 for fitting the radially outer ends of the spokes 8. The disc is resilient and also dished toward the webs of the friction members and serves to retain the webs against the backing plate 11 which is fixed either upon the axle housing or the steering spindle of the vehicle by suitable means such as the upper and lower pairs of bolts 12 and 13, respectively. 14 are coil springs between adjacent ends of the friction members for resiliently holding the friction members on the radially outer ends of the disc spokes. As shown, the friction members are formed with the radially inturned end portions 15 which are preferably welded to the ends of the webs 9 and through which the ends of the coil springs are hooked.

The friction members 6, 6' and 6² are individually anchored and the anchoring arrangement is such that the non-rotatable element comprising the friction members may be adjustably centered relative to the rotatable element comprising the brake drum. The anchor for the upper right friction member 6' comprises a bracket 16 fixedly secured to the backing plate 11 as by being riveted thereto. The bracket has the axially extending flanges 17 and 18 which are adapted to embrace the radially inturned end portion 15 at the inboard side of the web 9 and at the trailing end of the upper right friction member with the brake drum rotating in the direction indicated by the arrow in Figure 1 during forward movement of the motor vehicle, air plane, or the like. The flange portion 17 is located between the upper right and upper left friction members 6' and 6², respectively, and is preferably of greater width than the flange portion 18 to more effectively take care of the wrap of the upper right friction member during the normal rotation of the brake drum. The flange portion 18 serves as an anchor for the leading end of the upper right friction member when the brake is rotating in the opposite direction. It will be noted that the bracket provides for radial movement of the upper right friction member.

The anchors for the lower and upper left friction members 6 and 6², respectively, are located at their trailing ends with the brake drum rotating in the direction of the arrow in Figure 1. These anchors are alike and are located in the same horizontal plane. Furthermore, these anchors are adjustable and serve to center the non-rotatable element comprising the friction members and the disc relative to the rotatable element comprising the brake drum. In detail, the trailing end of each of the friction members 6 and 6² has secured to its web 9 as by welding the radial plate 19 which extends peripherally beyond the friction member and is provided with the radial opening 20 having parallel sides. 21 is a guide having the polygonal head 22 engaging the radial opening. The shank 23 of the guide extends through the eccentric 24 which extends through and is mounted on the backing plate 11. The shank 23 is externally threaded beyond the eccentric 24 to receive the nut 25 for clamping the guide to the eccentric. The shank is also formed beyond the nut with the diametral slot 26 for receiving a suitable tool, such as a screw driver, to position the head 22 so that its major axis extends radially of the brake. The length of the radial opening 20 is greater than the length of the head 22 along its major axis to provide radial clearance permitting radial movement of the friction member. The eccentric 24 is adapted to be fixedly secured to the backing plate by the nut 27 threaded upon the eccentric.

With this construction it will be seen that the eccentric 24 can be rotatably adjusted upon the backing plate 11 after the nut 27 has been loosened and the guide 21 can be rotatably adjusted to radially position the major axis of its head 22 after the nut 25 has been loosened. It will be further seen that by adjusting the anchor for the lower friction member and also the anchor for the upper left friction member all of the friction members and the actuating disc may be bodily moved to center the same with respect to the brake drum.

The friction members are moved radially outwardly against the internal friction face of the brake drum by flattening the resilient dished disc 5 and thereby compelling the radially outer ends of the disc spokes to move radially outwardly. The central or inner portion or hub 7 of the disc is moved axially in an inboard direction by the axially reciprocable sleeve 28 and the lever 29 operatively connected to the sleeve and adapted to be swung by the wheel cylinder 30. The sleeve extends through and bears upon the hub of the disc and carries the collar 28' bearing upon the annular flange portion of the hub. The lever has the body 31 at its upper end which is located in registration with the space between the two spokes 8 carrying the upper right and upper left friction members 6' and 6², respectively. This body is adapted to be engaged by the piston 32 which is reciprocable within the cylinder 33 of the wheel cylinder mounted upon the backing plate 11. The lever is formed with the furcations 34 which are pivotally mounted intermediate their ends upon the upper pair of bolts 12 and which at their lower ends abut the generally radial flange 35 upon the sleeve 28. It will be noted that the spacing between the spokes 8 provides for the use of an actuating lever which is strong and substantial in construction and can readily withstand any stress to which it is subjected.

Figures 5 and 6 show modified constructions of resilient dished discs upon the peripheries of which the friction members are mounted in the same manner as described with reference to Figures 1 to 4, inclusive. The disc 36 of Figure 5 has the radial central or inner portion or hub 37 extending at right angles to the disc axis and the radiating spokes 38 which are peripherally curved and also inclined to the disc axis in the same manner as the spokes 8 to make the disc dished. The disc 39 of Figure 6 differs essentially in forming its central or inner portion or hub of the inner part 40 extending at right angles to the disc axis and the outer part 41 inclined to the inner part and disc axis at the same angle as the radiating spokes 42.

In both discs 36 and 39 and the disc 5 the diameters of their central holes remain practically constant during operation so that the discs and their sleeves may be properly piloted relative to each other at all times.

What I claim as my invention is:

1. In a brake, relatively rotatable friction elements, one of said elements having an internal friction face and the other of said elements comprising friction members movable radially outwardly into engagement with said friction face and a resilient dished disc upon the periphery of which said friction members are mounted, springs for resiliently connecting the ends of said friction members together, common means for anchoring certain of said friction members and centering said last mentioned element relative to said first mentioned element, and means for flattening said disc.

2. In a brake, relatively rotatable friction elements, one of said elements having an internal friction face and the other of said elements comprising friction members movable generally radially into engagement with said friction face and a resilient disc upon the periphery of which said friction members are mounted, and means for anchoring said friction members comprising an anchor for one of said members having a rotatably adjustable eccentric and a guide rotatably adjustably carried by said eccentric and having a guide portion for said last mentioned friction member.

3. A brake comprising a brake drum element, a second element having a disc and friction members mounted upon the periphery of said disc and movable generally radially into engagement with said brake drum element, a backing plate and anchoring means on said backing plate for said friction members including a pair of like adjustable anchors each having an eccentric rotatably adjustably mounted on said backing plate, and a guide rotatably adjustably mounted on said eccentric provided with a head for guiding the associated friction member.

4. In a brake, relatively rotatable friction elements, one of said elements having an internal friction face and the other of said elements comprising friction members movable radially outwardly into engagement with said friction face and a resilient dished disc upon the periphery of which said friction members are mounted, said disc having an axially movable inner portion with a hole therethrough of practically constant diameter and a cylindrical member extending through the hole and bearing on said inner portion.

5. In a brake, relatively rotatable friction elements, one of said elements having an internal friction face and the other of said elements comprising friction members movable radially outwardly into engagement with said friction face and a resilient dished disc upon the periphery of which said friction members are mounted, said disc having an inner portion with an inner part extending at substantially right angles to the axis of said disc and provided with a hole therethrough of practically constant diameter and a cylindrical member extending through the hole and bearing on the portion of said inner part bounding said hole.

6. In a brake, relatively rotatable friction elements, one of said elements having an internal friction face and the other of said elements comprising friction members movable radially outwardly into engagement with said friction face and a resilient dished disc upon the periphery of which said friction members are mounted, said disc having a generally axially movable inner portion with a cylindrical part and an annular flange part and a cylindrical member extending through said cylindrical part and bearing thereon.

7. In a brake, relatively rotatable friction elements, one of said elements having an internal friction face and the other of said elements comprising friction members movable radially outwardly into engagement with said friction face and a resilient dished disc upon the periphery of which said friction members are mounted, said disc having an inner apertured part extending at right angles to the disc axis and an outer inclined part, and a cylindrical member extending through and bearing on said inner part.

8. In a brake, relatively rotatable friction elements, one of said elements having an internal friction face and the other of said elements comprising friction members movable radially outwardly into engagement with said friction face and a resilient disc upon which said friction members are positioned, and means for adjustably positioning said friction members relative to said first mentioned friction element comprising anchors for certain of said friction members adjustable to position said disc relative to said first mentioned friction element.

PHELPS M. FREER.